United States Patent
Zhou

(10) Patent No.: US 10,926,512 B1
(45) Date of Patent: Feb. 23, 2021

(54) METHOD FOR AFFIXING PROTECTIVE COMPONENT TO LIQUID CRYSTAL DISPLAY

(71) Applicant: Guangzhou Sunruo Technology Development Co., Ltd, Guangzhou (CN)

(72) Inventor: Rubiao Zhou, Guangzhou (CN)

(73) Assignee: Guangzhou Sunruo Technology Development Co., Ltd, Guangzhou (CN)

( * ) Notice: Subject to any disclaimer, the term of this patent is extended or adjusted under 35 U.S.C. 154(b) by 0 days.

(21) Appl. No.: 17/010,872

(22) Filed: Sep. 3, 2020

(30) Foreign Application Priority Data

Aug. 14, 2020 (CN) .......................... 202010820905.9

(51) Int. Cl.
    *B32B 5/14* (2006.01)
    *G02B 1/14* (2015.01)
    *G02F 1/1339* (2006.01)
(52) U.S. Cl.
    CPC .................. *B32B 5/14* (2013.01); *G02B 1/14* (2015.01); *G02F 1/1339* (2013.01); *B32B 2457/202* (2013.01)
(58) Field of Classification Search
    CPC ....... B32B 5/14; B32B 2457/202; G02B 1/14; G02F 1/1339
    See application file for complete search history.

(56) References Cited

U.S. PATENT DOCUMENTS

| | | | |
|---|---|---|---|
| 8,416,350 B2 | 4/2013 | Tsanev et al. | |
| 9,582,040 B2 | 2/2017 | Leonhard et al. | |
| 10,091,341 B1 | 10/2018 | Cha et al. | |
| 2009/0185100 A1* | 7/2009 | Matsuhira | G02B 6/0093 349/58 |
| 2012/0071217 A1 | 3/2012 | Park | |
| 2012/0247644 A1* | 10/2012 | Usui | B29C 66/45 156/64 |
| 2016/0349561 A1* | 12/2016 | Shiina | G02F 1/133512 |
| 2020/0285095 A1* | 9/2020 | Okumura | G02F 1/13454 |

FOREIGN PATENT DOCUMENTS

CN      110599920 A      12/2019

* cited by examiner

*Primary Examiner* — Mark A Osele
*Assistant Examiner* — Christopher C Caillouet
(74) *Attorney, Agent, or Firm* — True Shepherd LLC; Andrew C. Cheng

(57) ABSTRACT

A method for affixing a protective component to a liquid crystal display, specifically comprises placing a protective component on a surface of a liquid crystal display, wherein a white edge is formed between an edge of the protective component and an edge of the liquid crystal display with a curved surface; injecting solidifiable liquid glue into the white edge to fill a space of the white edge and then solidifying the liquid glue to make the edge of the protective component fit to the edge of the liquid crystal display. The white edge is eliminated in combination with solid and liquid glues, thereby improving the fit. This method can be widely applied to the field of electronic product technologies.

10 Claims, 2 Drawing Sheets

METHOD FOR AFFIXING PROTECTIVE COMPONENT TO LIQUID CRYSTAL DISPLAY

CROSS-REFERENCE TO RELATED APPLICATIONS

This application claims priority to Chinese Patent Application No. 202010820905.9 with a filing date of Aug. 14, 2020. The content of the aforementioned application, including any intervening amendments thereto, is incorporated herein by reference.

TECHNICAL FIELD

The present disclosure relates to the field of electronic product technologies, and in particular, to a method for affixing a protective component to a liquid crystal display.

BACKGROUND OF THE PRESENT INVENTION

In recent years, devices such as smart phones, smart watches, and tablets have become increasingly common. However, liquid crystal displays used are prone to breakage, especially for some full-screen devices, and the maintenance costs are high. Therefore, a protective film, such as high-strength tempered glass, is affixed to a surface of the liquid crystal display to protect the touch screen. With the development of technologies, devices with a curved screen are available on the market at present. Now there are also businesses launching protective films with a curved surface, and curved surface parts of such protective films are affixed through UV glue to eliminate a white edge. However, such a method is difficult to operate and easy to produce bubbles, and has poor fit. There are also methods for affixing the curved surface parts through double-sided adhesive, but such methods have defects such as poor fit and poor touch sensitivity.

SUMMARY OF PRESENT INVENTION

Aiming at least one of the above technical problems and improving the fit, the present disclosure provides a method for affixing a protective component to a liquid crystal display. The technical solutions adopted are as follows.

The method for affixing a protective component to a liquid crystal display provided in the present disclosure specifically includes placing the protective component on a surface of the liquid crystal display, wherein a white edge is formed between an edge of the protective component and an edge of the liquid crystal display with a curved surface; injecting solidifiable liquid glue into the white edge to fill a space of the white edge with the liquid glue; and solidifying the liquid glue to make the edge of the protective component fit to the edge of the liquid crystal display.

In some embodiments of the present disclosure, an inner side of the protective component is affixed to the surface of the liquid crystal display through solid adhesive.

In some embodiments of the present disclosure, the solid adhesive includes double-sided adhesive, AB glue or unlocking adhesive, etc.

In some embodiments of the present disclosure, the inner side of the protective component is entirely affixed to the surface of the liquid crystal display.

In some embodiments of the present disclosure, an edge of the protective component affixed to one side of the liquid crystal display is in a curved shape.

In some embodiments of the present disclosure, an edge of the protective component affixed to one side of the liquid crystal display is in a flat shape.

In some embodiments of the present disclosure, after the protective component is placed on the surface of the liquid crystal display, the white edge is reserved with a continuous gap at the edge of the protective component.

In some embodiments of the present disclosure, the protective component is made of tempered glass or a hardened transparent material.

In some embodiments of the present disclosure, the liquid glue is solidified by photocuring, baking, or natural solidification.

The embodiments of the present disclosure have at least the following beneficial effects: glue is injected in the white edge formed between curved surfaces of edges of the protective component and the liquid crystal display, and after the white edge is filled with the glue, the glue is solidified to make the edge of the protective component fit to a curved surface edge of the liquid crystal display. The white edge is eliminated in combination of solid and liquid glues, thereby improving the fit. This method can be widely applied to the field of electronic product technologies.

DESCRIPTION OF THE DRAWINGS

The above and/or additional aspects and advantages of the present disclosure will become apparent and easily understood from the description of embodiments with reference to the accompanying drawings below, in which.

Figure 1:
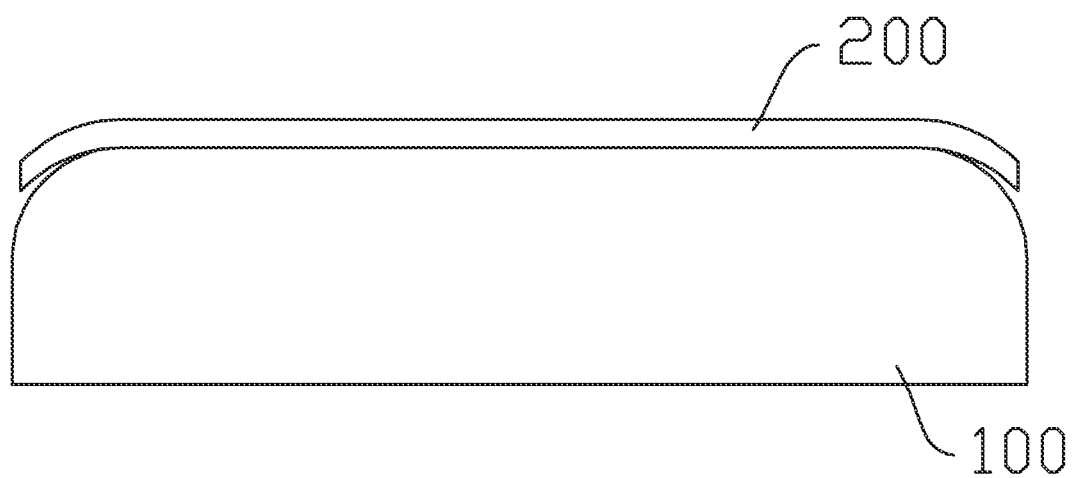
FIG. 1 is a schematic structural diagram illustrating that a protective component is affixed to a surface of a liquid crystal display, in which an edge of the protective component is in a curved shape, and a gap between curved surface parts of the edge and an edge of the liquid crystal display constitutes a reserved white edge.

Reference numerals: 100, liquid crystal display; 200, protective component.

DETAILED DESCRIPTION OF PREFERRED EMBODIMENTS

Figure 2:
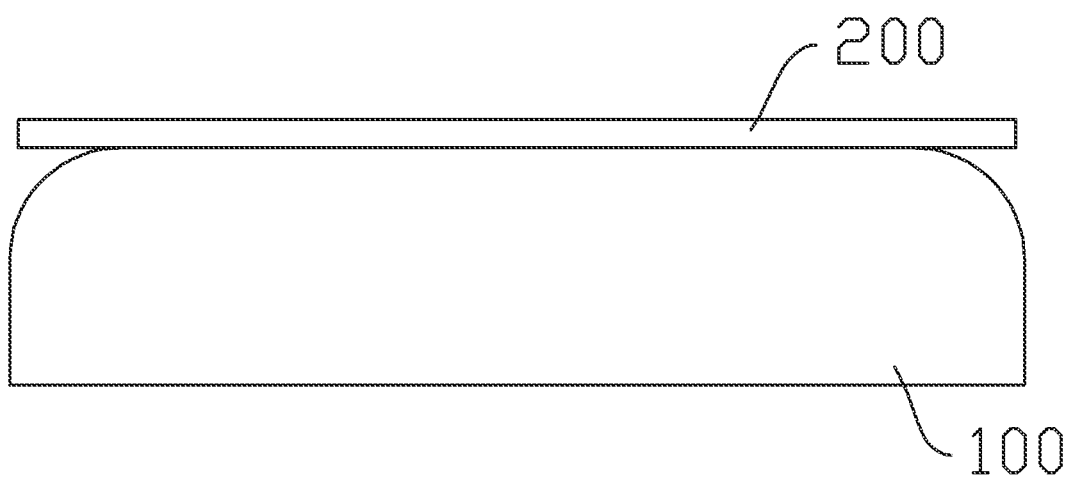
FIG. 2 is a schematic structural diagram illustrating that a protective component is affixed to a surface of a liquid crystal display, in which an edge of the protective component affixed to one side of the liquid crystal display is in a full plane shape, and a gap between curved surface parts of the edge and an edge of the liquid crystal display constitutes a reserved white edge.

Embodiments of the present disclosure are described in detail below with reference to FIG. 1 to FIG. 2. Examples of the embodiments are shown in the accompanying drawings, in which the same or similar reference numerals from beginning to end represent the same or similar elements or elements with the same or similar functions. The embodiments described below with reference to the accompanying drawings are exemplary and are intended only to explain the present disclosure and cannot be understood as limitations of the present disclosure.

In the description of the present disclosure, it should be understood that if orientation or position relations indicated by the terms such as "center", "middle", "longitudinal", "transverse", "length", "width", "thickness", "upper", "lower", "front", "back", "left", "right", "vertical", "horizontal", "top", "bottom", "inner", "outer", "axial", "radial", and "circumferential" are based on the orientation or position relations shown in the drawings, the terms are intended only to facilitate the description of the present disclosure and simplify the description, rather than indicating or implying that the apparatus or element referred to must have a specific orientation and be constructed and operated in the specific orientation, and therefore cannot be construed as a limitation on the present disclosure. In addition, a feature qualified by "first" or "second" may explicitly or implicitly include one or more features. In the description of the present disclosure, "multiple" means two or more, unless otherwise stated.

In the description of the present disclosure, it should be noted that the terms "mount", "connect with", and "connect" shall be understood in a broad sense, unless otherwise expressly provided and defined. For example, the terms may mean being fixedly connected, detachably connected, or integrally connected; or mechanically connected or electrically connected; or directly connected or indirectly connected through an intermediary; or connection inside two elements. For those of ordinary skill in the art, specific meanings of the above terms in the present disclosure can be understood according to specific situations.

The present disclosure relates to a method for affixing a protective component to a liquid crystal display. A protective component 200 is affixed to a surface of a liquid crystal display 100 having a curved screen in combination of solid and liquid glues, which plays a role of protection, eliminates the white edge and improves the fit. Specifically, the protective component 200 is placed on the surface of the liquid crystal display 100, a white edge is formed between an edge of the protective component 200 and an edge of the liquid crystal display 100 with a curved surface, solidifiable liquid glue is injected into the white edge, the liquid glue diffuses under molecular gravity to fill the entire gap of the white edge, and the liquid glue fills a space of the white edge and then solidifies to make the edge of the protective component 200 fit to the edge of the liquid crystal display 100.

Further, the liquid glue may be solidified by photocuring, baking, or natural solidification. Specifically, the liquid glue may be UV glue or other glue.

The inner side of the protective component 200 is affixed to the surface of the liquid crystal display 100 through solid adhesive, such as double-sided adhesive, AB glue or unlocking adhesive. For example, one side of the AB glue can automatically exhaust bubbles, and the other side has high viscosity and can be used to be affixed to the protective component 200. Further, in order to prevent a gap between the inner side of the protective component 200 and the surface of the liquid crystal display 100 due to solid glue in part of the inner side of the protective component 200, the inner side of the protective component 200 is entirely affixed to the surface of the liquid crystal display 100. For example, in a full-screen smart device with a screen fingerprint unlock functions, at a position where a fingerprint is unlocked on the screen, a protective film is affixed to the screen through double-sided adhesive, so that the fingerprint is accurately identified, but there is no double-sided adhesive in remaining regions on an inner side of the protective film. In this case, there is a large area of unfitted regions between the protective film and the touch screen, which affects display and touch of the screen. Therefore, the surface is entirely affixed to avoid this situation. Certainly, local affixation may also be used. For example, in a middle region of a plane part of the liquid crystal display 100, the edge of the plane part is left blank, which has not been affixed through the solid adhesive.

The protective component 200 is made of tempered glass or a hardened transparent material. Specifically, an edge of the protective component 200 affixed to one side of the liquid crystal display 100 is in a curved shape. Further, the edge of the protective component 200 is in a curved shape, for example, it is made into a curved shape after heat bending treatment, which matches the shape of the curved screen of the liquid crystal display 100. Further, after the protective component 200 is placed on the surface of the liquid crystal display 100, the white edge is reserved with a continuous gap at the edge of the protective component. Specifically, considering that the liquid glue should flow spontaneously to fill the gap of the white edge, after the protective component 200 is affixed to the surface of the liquid crystal display 100, a gap should be reserved between a curved surface part of the edge and a curved surface part of an edge of the curved screen to form a continuous white edge. It should be noted that during hot bending treatment of the protective component 200, the curved surface structure of the edge of the protective component 200 was treated with less curvature than that of the edge of the curved screen of the liquid crystal display 100, and the bending degree of the edge of the protective component 200 was less than that of the edge of the curved screen, forming a non-coincidence to constitute a reserved continuous white edge.

Certainly, for some liquid crystal displays 100 without a curved screen, an edge does not need to be made into a curved shape. An edge of the protective component 200 affixed to one side of the liquid crystal display 100 is in a plane, that is, one side of the protective component 200 affixed to the liquid crystal display 100 is in a full plane shape. Specifically, the edge of the liquid crystal display 100 is designed to a curved surface edge with a large radius of curvature by means of polishing or grinding, the protective component 200 is neatly affixed to the surface of liquid crystal display 100, and the edge of the protective component 200 does not coincide with the curved surface edge of the liquid crystal display 100, constituting a reserved continuous white edge.

In the description of the specification, the descriptions about the reference terms "an embodiment", "some examples", "some embodiments", "schematic embodiment(s)", "example(s)", "specific example(s)", "some examples" and the like mean that specific features, structures, materials or characteristics described in combination with the embodiment(s) or example(s) are included in at least one embodiment or example of the present disclosure. In the specification, schematic expressions of the above terms do not necessarily refer to the same embodiment or example. Moreover, the specific features, structures, materials or characteristics described may be combined in a suitable manner in any one or more embodiments or examples.

Implementations of the present disclosure are described above in detail with reference to the accompanying drawings, but the present disclosure is not limited to the above implementations. Within the scope of knowledge possessed by those of ordinary skill in the art, various changes can also be made without departing from the purpose of the present disclosure.

What is claimed is:

1. A method for affixing a protective component to a liquid crystal display, comprising:
   placing the protective component (200) on a surface of the liquid crystal display (100) that includes an edge having a first curvature, wherein the protective component includes an inner side and an edge that has a second curvature, the second curvature being different from the first curvature of the edge of the liquid crystal display such that a space is formed between the edge of the protective component and the edge of the surface of the liquid crystal display, the space defining a white edge between the edge of the protective component (200) and the edge of the surface of the liquid crystal display (100);

injecting solidifiable liquid glue into the white edge to fill a space of the white edge; and solidifying the liquid glue to make the edge of the protective component (200) fit to the edge of the surface of the liquid crystal display (100);

wherein the liquid glue filled in the space of the white edge is solidified between the edge of the protective component and the edge of the surface of the liquid crystal display to remove the space formed by the first and second curvatures of the edge of the protective component and the edge of the surface of the liquid crystal display so as to eliminate the white edge.

2. The method according to claim 1, wherein the inner side of the protective component (200) is affixed to the surface of the liquid crystal display (100) through solid adhesive that is different from the solidified liquid glue filled in the space of the white edge.

3. The method according to claim 2, wherein the solid adhesive is double-sided adhesive, AB glue, or unlocking adhesive.

4. The method according to claim 2, wherein the inner side of the protective component (200) is entirely affixed to the surface of the liquid crystal display (100).

5. The method according to claim 1, wherein the edge of the protective component (200) affixed to the edge of the surface of the liquid crystal display (100) is in a curved shape.

6. The method according to claim 5, wherein after the protective component (200) is placed on the surface of the liquid crystal display (100), the white edge is reserved with a continuous gap at the edge of the protective component.

7. The method according to claim 6, wherein the protective component (200) is made of tempered glass or a hardened transparent material.

8. The method according to claim 1, wherein the edge of the protective component (200) affixed to the edge of the surface of the liquid crystal display (100) is in a flat shape.

9. The method according to claim 8, wherein after the protective component (200) is placed on the surface of the liquid crystal display (100), the white edge is reserved with a continuous gap at the edge of the protective component.

10. The method according to claim 1, wherein the liquid glue is solidified by photocuring, baking, or natural solidification.

\* \* \* \* \*